No. 661,189. Patented Nov. 6, 1900.
F. J. OLSEN & E. H. WHITMORE.
APPARATUS FOR FILTERING WATER.
(Application filed Mar. 15, 1900.)
(No Model.)
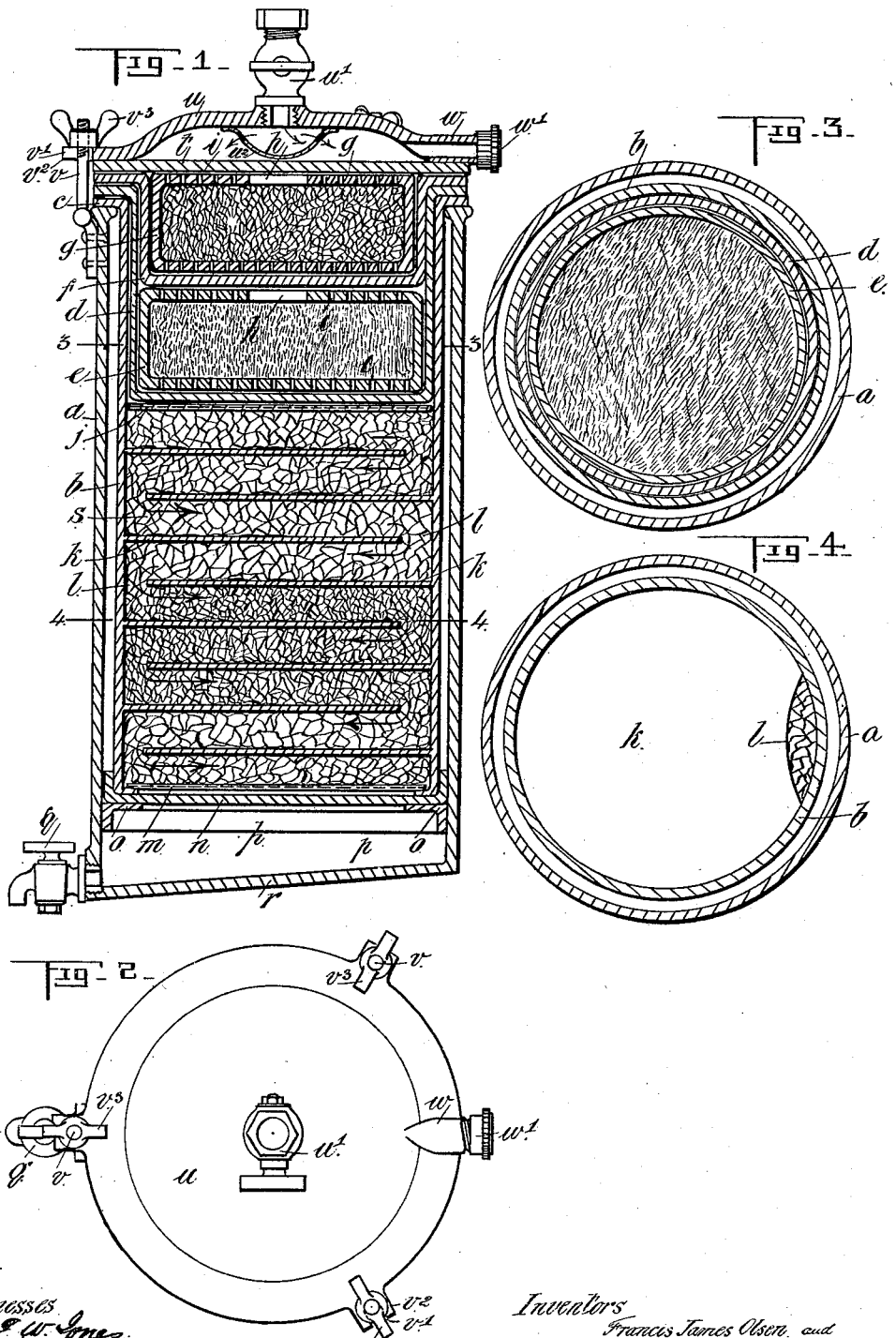
Witnesses
Inventors
Francis James Olsen and
Edward Henry Whitmore
by their Attorney

UNITED STATES PATENT OFFICE.

FRANCIS JAMES OLSEN AND EDWARD HENRY WHITMORE, OF CHRIST-CHURCH, NEW ZEALAND.

APPARATUS FOR FILTERING WATER.

SPECIFICATION forming part of Letters Patent No. 661,189, dated November 6, 1900.

Application filed March 15, 1900. Serial No. 8,858. (No model.)

*To all whom it may concern:*

Be it known that we, FRANCIS JAMES OLSEN and EDWARD HENRY WHITMORE, subjects of Her Majesty the Queen of Great Britain, residing at 183 Hereford street, Christchurch, in the Colony of New Zealand, have invented new and useful Improved Apparatus for Filtering Water, of which the following is a specification.

This invention provides improved apparatus more particularly adapted for the rapid filtration of water under high pressure and containing chemical impurities and solid matter in suspension. It may, however, be also used to treat water under low pressure.

The apparatus consists of two cylindrical vessels, one of which is placed within the other and contains receptacles filled with charcoal and lime. The inner cylinder is also provided with a plurality of superposed shelves forming a number of compartments, one communicating with the other by an opening formed in each shelf. The space between the shelves is filled with broken granite or quartz, and the openings in the shelves are arranged so that the water under treatment has to pass over as large an area of the broken granite as possible.

A feature of the invention consists in the employment of disks or cups of felt for removing silt and solid matter from the water.

We will now more particularly describe our invention by the aid of the accompanying drawings, wherein—

Figure 1 is a vertical central sectional elevation; Fig. 2, a plan; Fig. 3, a sectional plan on 3 3, Fig. 1; and Fig. 4, a sectional plan on 4 4, Fig. 1.

Similar letters of reference indicate the same parts throughout the figures.

The outer cylinder $a$ receives the cylinder $b$, which has a flange $c$, resting upon the top of cylinder $a$. A cup $d$, made of felt or similar material, is placed within the upper part of cylinder $b$ and receives a drum $e$, which is preferably made of porcelain, containing charcoal. A second felt cup $f$ within cup $d$ receives a drum $g$, similar to drum $e$, containing lime. Each of the drums $e$ and $g$ has an opening $h$ upon its upper side to permit of the removal of its contents, and the top and bottom of each drum have perforations $i$ to allow passage of water. Above drum $g$ is a disk of felt $t$, and beneath cup $d$ is a disk $j$ of woven wire or similar reticular material, and secured within the cylinder $b$ below the wire are superposed shelves or division-plates $k$, whereby a series of compartments $s$ is formed, each of which has communication with the chamber immediately above and below it through an opening $l$, with which each division-plate is provided. The compartments $s$ are filled with broken granite, quartz, or gravel, and the openings $l$ are formed upon opposite sides of the cylinder in alternate division-plates. The lower cover of cylinder $b$ is perforated or formed of woven wire $m$, which rests upon the inturned lower edge of the cylinder $b$, and the bottom of the cylinder fits within a felt cup $n$, supported upon an angle-ring $o$, secured within cylinder $a$. Beneath the felt $n$ is a chamber $p$ for filtered water, which may be withdrawn through a draw-off tap $q$.

The base $r$ of cylinder $a$ is shown inclined in the illustrations to allow the whole of the water to be drawn from chamber $p$; but a horizontal base may be used, if desired.

The felt cups $d$ $f$ and disk $t$ have each a flange resting upon the flange $c$ of cylinder $b$ and clamped between it and the cover $u$, which is secured in position by bolts $v$, hinged upon cylinder $a$, each taking into a slot $v'$, formed in an ear $v^2$, projecting from the cover, and having a wing-nut $v^3$, which screws down upon the ear.

Cover $u$ is made dome-shaped and has a tap $u'$, to which is connected a pipe or hose bringing in the water to be filtered.

A blow through pipe $w$, the end of which is covered by a screw-cap $w'$, is employed to permit silt and the like to be washed from the upper surface of the felt disk $t$ when necessary.

When the water being treated is not improved by the employment of lime in filtration, the lime in drum $g$ may be substituted by charcoal or the drum left out of the apparatus.

In operation water is admitted through tap $u'$ and passes through the felt $t$, the lime in drum $g$, the felt $f$, the charcoal in drum $e$, and the felt $d$ to the chambers $s$, containing the broken granite. The openings $l$ being arranged diametrically opposite to each other in alternate division-plates, the water flows in the direction indicated by the arrows, Fig. 1, and passes over a comparatively large area of broken granite before reaching the felt disk $n$, through which it passes to the chamber $p$.

There are many ways in which cover $u$ may be secured in position in addition to that above described.

In our apparatus the parts which require cleansing can be readily withdrawn, and especially the upper felt disk $t$ can be easily removed whenever necessary and replaced by another disk kept for the purpose which has been purified.

What we claim as our invention, and desire to secure by Letters Patent, is—

1. In water-filtering apparatus the combination of two cylinders one within the other, the inner cylinder having superposed compartments containing broken granite, a felt cup within the upper part of said inner cylinder receiving a perforated drum containing charcoal, a second felt cup within the first arranged above the drum containing charcoal and receiving a perforated drum containing lime, a felt disk above the lime-drum, a cover through which water to be filtered is supplied means for securing said cover to the outer cylinder whereby the felt cups and felt disk are clamped in position a felt disk at the bottom of said inner cylinder, a chamber beneath it receiving filtered water and a tap upon the outer cylinder for withdrawing water from the chamber substantially as specified herein and illustrated.

2. The combination in water-filtering apparatus of two cylinders one within the other the inner cylinder having superposed compartments containing broken granite, a felt cup within the upper part of said inner cylinder receiving a perforated drum containing charcoal, a felt disk above said drum a cover having an opening to admit water to be filtered means for securing said cover to the outer cylinder and clamping the felt cup and disk in position a felt disk at the bottom of said inner cylinder a chamber beneath said inner cylinder receiving filtered water and a tap upon the outer cylinder for withdrawing water therefrom substantially as specified.

3. The combination in filtering apparatus of a cylinder containing broken quartz a felt cup within the upper part of said cylinder a perforated drum within said felt cup containing charcoal a cover over said cup through which water to be treated is admitted a reservoir for filtered water at the perforated bottom of said cylinder and a tap for withdrawing water from said reservoir substantially as specified and illustrated.

4. The combination in water-filtering apparatus of two cylinders one within the other the inner cylinder containing broken granite a felt cup within the upper part of said inner cylinder receiving a perforated drum containing charcoal, a felt disk above said drum a cover having an opening to admit water to be filtered means for securing said cover to the outer cylinder and clamping the felt cups and disk in position a felt disk at the bottom of said inner cylinder a chamber beneath said inner cylinder receiving filtered water and a tap upon the outer cylinder for withdrawing water therefrom substantially as specified.

In testimony whereof we have signed this specification in the presence of two subscribing witnesses.

FRANCIS JAMES OLSEN.
EDWARD HENRY WHITMORE.

Witnesses:
HENRIE H. RAYWARD,
ERNEST J. ANSTISS.